June 29, 1948.	O. LECANU-DESCHAMPS	2,444,201
AUTOMOBILE BAGGAGE CARRIER
Filed Aug. 25, 1937
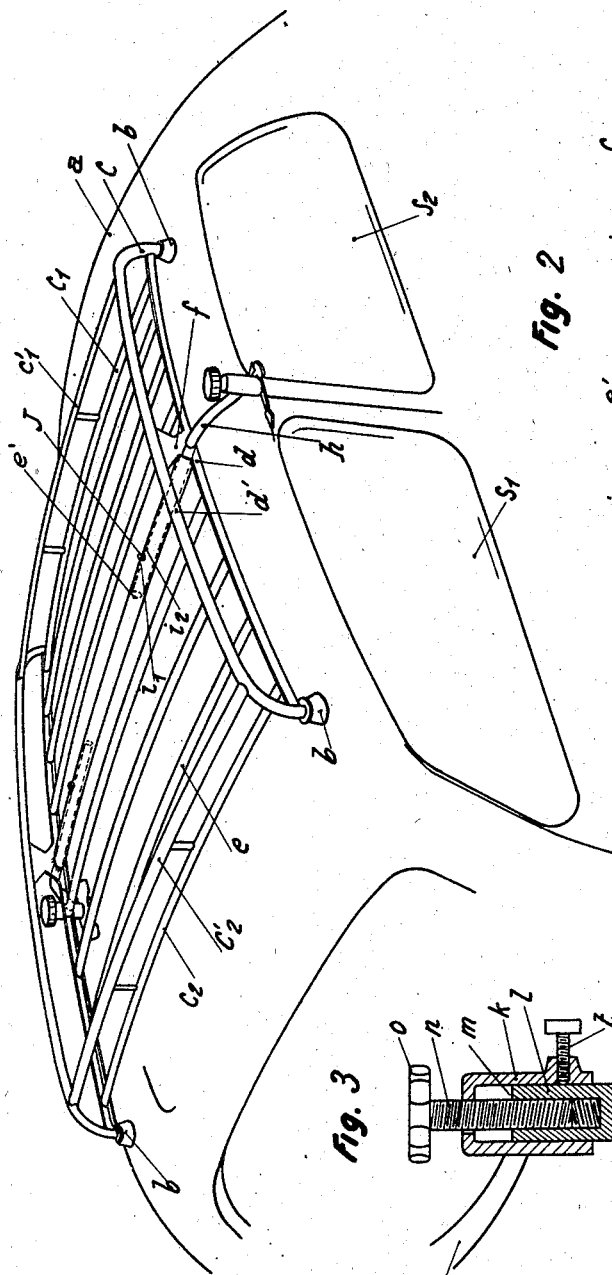
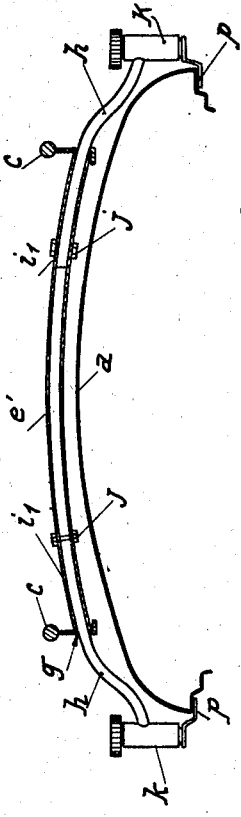
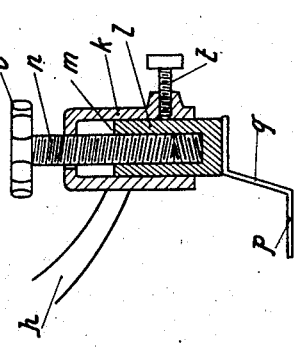
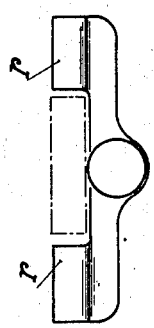
INVENTOR
Olivier Lecanu-Deschamps
By Watson, Coit, Morse & Grindle
ATTYS.

Patented June 29, 1948

2,444,201

UNITED STATES PATENT OFFICE 2,444,201

AUTOMOBILE BAGGAGE CARRIER

Olivier Lecanu-Deschamps, Paris, France

Application August 25, 1937, Serial No. 160,933
In France September 29, 1936

Section 3, Public Law 690, August 8, 1946
Patent expires September 29, 1956

2 Claims. (Cl. 224—42.1)

1

The present invention has for its object modifications in the boat-carriers, ski-carriers, trunk-carriers, etc., for automobile vehicles described in particular in the main French Patent No. 738,362 of June 9, 1932, and in the first and second patents of addition, which modifications relate to a novel system of mounting the apparatus on the roof of the vehicle. Said system is characterized in that it is composed of a U-bracket engaging under the roof at the central portion of the vehicle, between the two doors on the same side, and connected by a variably spaceable system to the set of cross-pieces forming a luggage-carrier, ski-carrier, etc.

According to the invention, the luggage carrier comprises a frame terminated at its ends by rubber shock absorbers at its four corners adapted to bear on the roof of the vehicle, which frame is stayed by sets of cross-pieces, one of which, the central cross-piece, is placed in the vertical plane perpendicular to the axis of the vehicle, passing between the two doors located on either side of the body. This hollow central cross-piece receives on either side of the body a rod which can be made to penetrate more or less deeply therein and which is provided with bores adapted to receive the ends of screws engaged in the hollow central cross-piece to lock them in adjustment. These bars are themselves each secured to a vertical sleeve slidingly accommodating an internally threaded thimble and to which is welded a U-shaped tongue adapted to engage under the roof of the vehicle. An adjustable bolt enables the thimble to be slid inside the sleeve more or less in unison with the fixing tongue. An additional screw arranged perpendicular to the said sleeve enables the thimble to be held tightly in position in the sleeve.

The accompanying drawings show by way of example an embodiment of the invention. In said drawings:

Fig. 1 is a perspective view of the luggage-carrier mounted on an automobile vehicle with inside drive.

Fig. 2 is a partial transverse section of the luggage-carrier;

Figs. 3 and 4 show respectively in section and in plan details of construction.

On the roof or top $a$ of the vehicle there rests, through the intermediary of rubber elements $b$, the luggage-carrier comprising a metal frame $c$ formed of flat iron bars $d$ connected by cross-pieces $e$ of which the central one $e'$ at least is tubular or semi-tubular and hollow. The last of the cross-pieces such as $c_1$ and $c_2$ are vertically connected to cross-pieces located slightly there-

2 above $c'_2$, $c'_1$, which are themselves connected to side members $d'$ arranged in parallel to the axis of the vehicle. Facing the central cross-piece $e'$ the side members $d$ and $d'$ are connected by a plate $f$ provided with a bore $g$ in which engages a rod $h$ of the same shape in cross-section as the cross-piece $e'$ but of smaller dimensions so as to slide with a running fit, and provided with bores $i_1$, $i_2$ adapted to receive screws $j$ arranged on the part $e'$ and passing through same, in such a manner that the depth to which the rods $h$ penetrate into the cross-piece $e'$ can be adjusted at will in a fixed manner. The rod $h$ is secured, whether it be cast integral with or whether it be welded, to a sleeve $k$ within which slides a thimble $l$ which is internally threaded as at $m$, so as to accommodate a bolt $n$ having a head $o$. The thimble $l$ is secured in any appropriate manner to a cut out plate $p$ which can preferably be curved, offset, or bent as at $q$ and of which the ends $r$ engage as seen in Fig. 2 in the transverse fillister of the top of the two doors $s_1$, $s_2$ on the same side. A screw $t$ which is perpendicular to the sleeve $k$ and which engages therein enables the thimble $l$ to be clamped within the sleeve $k$.

It will readily be understood what can be the means of mounting and dismounting the present luggage-carrier. The frame is placed on the roof and the rod $h$ is more or less deeply engaged in the cross-piece $e'$, according to the respective widths of the roof and of the frame. The tapped hole of the rod $h$ coincides with one of the bores of the cross-piece $e'$, a clamping bolt or screw is then introduced, securing the cross-piece to the rod.

The tongues $r$ are then placed under the fillister as seen in Fig. 2, then the bolt $n$ is engaged in the sleeve $k$ until it is screwed on the thimble $l$. The said bolt $n$ is tightened by means of the knob $o$ until the tongue $r$ is completely pressed against the fillister, and the rubber elements $b$ press on the body. At this time, to lock the thimble $l$ in the sleeve $k$, the screw $t$ seen in Fig. 3 is tightened.

I claim:

1. For use on the roof of an automobile having an overhanging fillister, a luggage carrier which comprises, in combination, a grill structure including a series of small luggage supporting bars extending transversely of the roof and two side bars secured respectively to the ends of said first named bars on either side of the grill, and extending longitudinally of the automobile, supporting legs one at each of the ends of each of said side bars, adapted to bear upon the roof surface, one of the transverse luggage suporting bars adjacent the longitudinal center of the structure having tubular end portions, a rod slidable within each of the open ends of said tubular bar, downward extensions on the respective outer ends of said rods and means for clamping said extensions to said fillister, said rods providing for slight pivotal adjustment of said carrier about the axis of said rods.

2. For use on the roof of an automobile having an overhanging fillister, a luggage carrier which comprises, in combination, a substantially rectangular grill structure having downwardly extending legs at each of its four corners, each leg provided with a resilient foot adapted to bear upon the roof surface, tubular sockets in each side of said structure adjacent the longitudinal center thereof, a rod slidably adjustable within each of said sockets upon each side of the structure, means for adjustably securing said rods within said sockets to accommodate the arrangement to automobiles of various widths, downward extensions on the respective outer ends of said rods, and adjustable means for clamping said extensions to said fillister, said rods providing for slight pivotal adjustment of said carrier about the axis of said rods.

OLIVIER LECANU-DESCHAMPS.

REFERENCES CITED

The following references are of record in the file of this patent:

UNITED STATES PATENTS

| Number | Name | Date |
|---|---|---|
| 1,665,358 | Hall et al. | Apr. 10, 1928 |
| 1,748,282 | Ellis | Feb. 25, 1930 |
| 1,894,083 | Chaney | Jan. 10, 1933 |
| 1,896,628 | Jepsen | Feb. 7, 1933 |
| 2,009,721 | Williams | July 30, 1935 |

FOREIGN PATENTS

| Number | Country | Date |
|---|---|---|
| 776,636 | France | Nov. 8, 1934 |
| 44,648 (Addn.) | France | Dec. 15, 1934 |
| 45,530 (Addn.) | France | June 17, 1935 |
| 782,775 | France | Mar. 25, 1935 |